United States Patent [19]
Fleck et al.

[11] Patent Number: 5,138,640
[45] Date of Patent: Aug. 11, 1992

[54] CIRCUIT CONFIGURATION FOR IMPROVING THE RESOLUTION OF SUCCESSIVE PULSED SIGNALS OVER TIME

[75] Inventors: Rod Fleck, Munich; Karl-Heinz Mattheis, Forstinning; Christoph Meinhold, Planegg; Steffen Storandt, Ottobrunn-Riemerling, all of Fed. Rep. of Germany

[73] Assignee: Siemens Aktiengesellschaft, Munich, Fed. Rep. of Germany

[21] Appl. No.: 611,018

[22] Filed: Nov. 9, 1990

[30] Foreign Application Priority Data

Jul. 12, 1990 [DE] Fed. Rep. of Germany ... 9010488[U]

[51] Int. Cl.[5] .......................... G06M 3/00; H03K 3/78
[52] U.S. Cl. .......................... 377/39; 377/44; 377/17; 377/47
[58] Field of Search .................. 377/39, 44, 17, 47

[56] References Cited

U.S. PATENT DOCUMENTS

| | | | |
|---|---|---|---|
| 3,137,818 | 6/1964 | Clapper | 377/39 |
| 3,753,125 | 8/1973 | Ishikawa et al. | 377/39 |
| 4,001,699 | 1/1977 | Denny et al. | 377/39 |
| 4,086,471 | 4/1978 | Takahashi | 377/44 |
| 4,229,795 | 10/1980 | Vieweg et al. | 377/44 |
| 4,912,734 | 3/1990 | Frauenglass | 377/44 |

OTHER PUBLICATIONS

Tietze-Schenk "Halbleiter-Schaltungstechnk", 1986, pp. 240-251.

Primary Examiner—John S. Heyman
Attorney, Agent, or Firm—Herbert L. Lerner; Laurence A. Greenberg

[57] ABSTRACT

A circuit configuration for improving the resolution of successive pulsed signals over time includes first and second counters each having one clock input, the clock input of the first counter being supplied with a first clock signal, and the clock input of the second counter being supplied with a second clock signal having a n-multiple frequency of the first clock signal. The first counter has a control input and a counter output, the control input of the first counter being supplied with successive pulsed signals. The second counter has a counter input, an overflow output and a write input, the write input of the second counter being connected to the overflow output of the second counter. A register has a data input, a data output, and a write input, the data input of the register being connected to the counter output of the first counter, the write input of the register being connected to the control input of the first counter, and the data output of the register being connected to the counter input of the second counter. The counter state of the first counter is written into the register through the counter output of the first counter and the first counter is subsequently reset, upon one of the successive pulsed signals being supplied to the control input of the first counter. The second counter assumes the value of the register when an overflow signal is tripped.

10 Claims, 2 Drawing Sheets

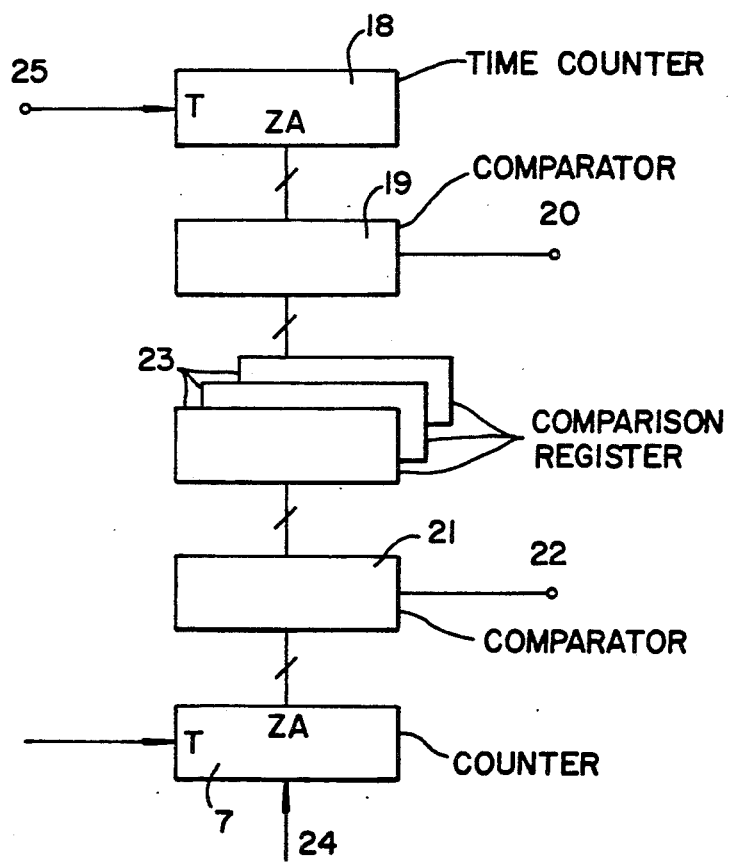

CIRCUIT CONFIGURATION FOR IMPROVING THE RESOLUTION OF SUCCESSIVE PULSED SIGNALS OVER TIME

The invention relates to a circuit configuration for improving the resolution of successive pulsed signals over time.

When controlling analog processes with microprocessors, analog input variables must be digitized, to enable them to be processed by given algorithms or control programs. If the input variable in a control system is the rotary angle of a crankshaft, for instance, then gear wheels on the crankshaft are usually used for such a purpose, while the teeth of the gear wheels trip pulses as they move past a sensor. Each pulse then stands for a predetermined angle. The pulses are then delivered for further processing, such as to a microprocessor, which performs a control of the system in accordance with its program. If the gear wheel has 60 teeth, for example, then the succession of two pulses stands for a rotary angle of 6°. The maximum angle resolution can be increased, for instance, by increasing the number of teeth of the gear wheel. Obviously there is a limit to mechanically increasing the angular resolution in such a way.

A further option for increasing the resolution of successive pulsed signals over time is obtained if an electronic system is supplied by a sensor with one reference signal, which is equivalent to a certain angular position of the system, once (or several times) per revolution. The angular speed is ascertained, for instance, by a process computer, from the chronological spacing between the two signals. Based on the operating conditions, desired angles can be converted into a time with the aid of the angular speed, and can be adjusted by a time counter. When there is a constant rotational speed, good accuracy is obtained if there is sufficiently fine resolution over time. However, upon acceleration, the rotational speed between measurement and adjustment can vary so greatly that a large error in the output of angle-related signals can occur.

Another option is to use a counter that measures the time between two pulses. Such counters are known from the book entitled Halbleiter-Schaltungstechnik [Semiconductor Circuitry] by Tietze and Schenk, 8th ed., 1986, pp. 240 ff. In that device, a clock signal is supplied to the clock input of a counter, and the pulsed signals of the gear wheel are supplied to the control input. The system is also supplied with one or more reference signals (such as a zero degree position of the gear wheel). A desired angle is set by counting angular pulses relative to the reference signal. Times which occur after measurement of the angular speed, which is obtained from the time interval between two or more angle pulses, are first converted into angles. In that method, on one hand the resolution is limited by the practically limited number of angular pulses per revolution and on the other hand, the times to be adjusted upon acceleration become wrong or are falsified.

It is additionally often desirable for a digital control signal to be generated at a predetermined angular position and to have a defined pulse duration.

It is accordingly an object of the invention to provide a circuit configuration for improving the resolution of successive pulsed signals over time, which overcomes the hereinafore-mentioned disadvantages of the heretofore-known devices of this general type and to generate control signals as a function of these signals.

With the foregoing and other objects in view there is provided, in accordance with the invention, a circuit configuration for improving the resolution of successive pulsed signals over time, comprising first and second counters each having one clock input, the clock input of the first counter being supplied with a first clock signal, and the clock input of the second counter being supplied with a second clock signal having an n-multiple frequency of the first clock signal; the first counter having a control input and a counter output, the control input of the first counter being supplied with successive pulsed signals; the second counter having a counter input, an overflow output and a write input, the write input of the second counter being connected to the overflow output of the second counter; a register having a data input, a data output, and a write input, the data input of the register being connected to the counter output of the first counter, the write input of the register being connected to the control input of the first counter, and the data output of the register being connected to the counter input of the second counter; the counter state of the first counter being written into the register through the counter output of the first counter and the first counter being subsequently reset, upon one of the successive pulsed signals being supplied to the control input of the first counter; and the second counter assuming the value of the register when an overflow signal is tripped.

In accordance with another feature of the invention, the register is a two's-complement-forming register, and the first and second counters count in the same counting direction.

In accordance with a further feature of the invention, the first and second counters count in opposite directions, and the register is a single register.

In accordance with an added feature of the invention, the register is a single register, the first and second counters count in the same counting direction, the second counter generates an overflow signal upon attainment of a value stored in memory in the register, and the second counter is reset.

In accordance with an additional feature of the invention, there is provided a third counter having a clock input connected to the overflow output of the second counter.

In accordance with yet another feature of the invention, there are provided means for generating the first and second clock signals and enabling control of the frequency of the first and second clock signals.

In accordance with yet a further feature of the invention, there is provided at least one comparison register, and at least one comparator connected between the at least one comparison register and the third counter for comparing the counter state of the third counter with the contents of the at least one comparison register and generating an output signal upon a match with a predefined logical condition.

In accordance with yet an added feature of the invention, there is provided at least one further counter being started after the generation of an output signal from the comparator, and at least one further comparator connected between the at least one further counter and the at least one comparison register for comparing the counter state of the further counter with the contents of the at least one comparison register and generating an output signal upon a match with a predetermined logical condition.

In accordance with a concomitant feature of the invention, the at least one comparison register is a plurality of comparison registers, and there is provided at least one further counter having a clock input being supplied with a clock signal, means for transferring the counter state of the further counter after being increased by a predetermined value to one of the comparison registers after the generation of the output signal of the comparator, and a further comparator connected between the at least one further counter and the one comparison register for comparing the counter state of the further counter with the contents of a preselected comparison register and generating an output signal upon a match with a predetermined logical condition.

The basic principle of the invention is the multiplication of the input pulses. In this process, n additional pulses are always generated between two pulses, regardless of the time interval between them. The time interval of these additional pulses is intended to be 1/n of the time between two input pulses. This can be attained, for instance, by providing that the number of pulses of a first clock signal at frequency f between two successive pulsed input signals is ascertained, and that the pulses of a second clock signal, having a frequency which is an n multiple of the frequency of the first clock signal, are counted. If the second counter attains the number ascertained by the first counter, then an output pulse is generated. In this way, the input pulses are multiplied. The frequency of the output pulse train is then precisely equal to n times the frequency of the input pulses. The advantage of the invention is that error in the values being ascertained is avoided even upon acceleration.

Other features which are considered as characteristic for the invention are set forth in the appended claims.

Although the invention is illustrated and described herein as embodied in a circuit configuration for improving the resolution of successive pulsed signals over time, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

FIG. 3 is a block circuit diagram of a basic circuit configuration for evaluating certain event times.

Figure 1:
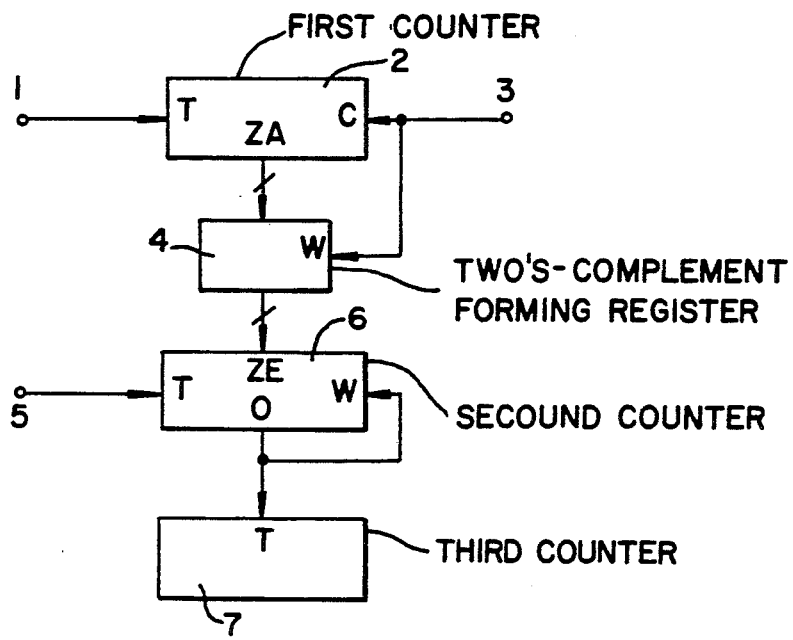
FIG. 1 is a block circuit diagram of a basic circuit configuration according to the invention.

Referring now to the figures of the drawing in detail and first, particularly, to FIG. 1 thereof, there is seen a first counter 2 with a clock input T, a control input C and a counter output ZA. A first clock signal 1 is supplied to the clock input T, and successive pulsed signals 3 are supplied to the control input C. A two's-complement-forming register 4 with a write input W, a data input and a data output is provided. The data input is connected to the counter output ZA of the first counter 2. The successive pulsed signals 3 are supplied to the write input W. The data output of the register is connected to a counter input ZE of a second counter 6. A second clock signal 5 is supplied to a clock input T of the second counter 6. An overflow output 0 is connected to both a write input W of the second counter 6 and a clock input T of a third counter 7. The circuit configuration according to the invention may, for instance, ascertain the rotary angle of a crankshaft. In that case, the input pulses 3 are the pulses of a gear wheel transducer.

The first clock signal 1, which has a constant frequency f, clocks the first time counter 2. The pulsed signals 3 are supplied to the control input C of the first counter 2. The first counter 2 operates as an upward counter. In this way, the time between two successive pulses is measured and stored in memory in the register 4. This can, for instance, be carried out in such a way that when a pulse arrives at the control input of the first counter 2, its instantaneous counter state is transferred by the same pulse to the register 4, and the counter 2 is then set to zero. The contents of the register 4 are then a measure of the time between two pulses. The second time counter 6, which is likewise operated in the upward direction, passes through precisely as many values for one full counting cycle as the register 4 indicates. This can be attained, for instance, by providing that the register 4 forms the two's complement of its contents, and this value is taken on or adopted by the time counter 6 as a starting value. The clock frequency of the second counter 6 is an n multiple of the frequency of the first clock signal. When the second counter 6 overflows, it generates an output signal at the output 0, which on one hand causes the second time counter 6 to take a new starting value from the register 4 and on the other hand can be supplied to the clock input T of the third time counter 7.

Since the second time counter 6 is operated with the n-multiple input frequency of the first time counter 2, n full counting cycles elapse between two pulses of the input signal 3. The time counter 7 can serve as the angle counter itself. With the configuration as described, this counter is operated with the n-multiple pulse frequency of the input signal 3.

If the time interval between two pulses varies, this is already perceptible at the time counter 7 within the next interval.

If the second counter 6 is a backward counter instead of a forward counter, then the register 4 can be a single register instead of a complement-forming register. If a single register 4 is used, then it would also be conceivable to make the counter 6 a forward counter that generates an overflow signal at the output 0 upon attaining the value stored in memory in the register 4 and then is reset to the value of 0.

In the case of the circuit configuration shown in FIG. 1, the following applies: If the same counter types are used for the first and second counters 2, 6, or in other words if either an upward counter or a downward counter is used for both, then the register 4 must be a complement-forming register. If complementary counter types are used for the first and second counters 2, 6, then a single register 4 suffices.

If the above-described circuit configuration is used for receiving angular pulses, then it is often necessary to adapt the frequencies f, n×f of the counters 2 and 6 to different rotational speed ranges. This is necessary, for instance, in order to prevent an overflow of the first counter at low rpm.

Figure 2:
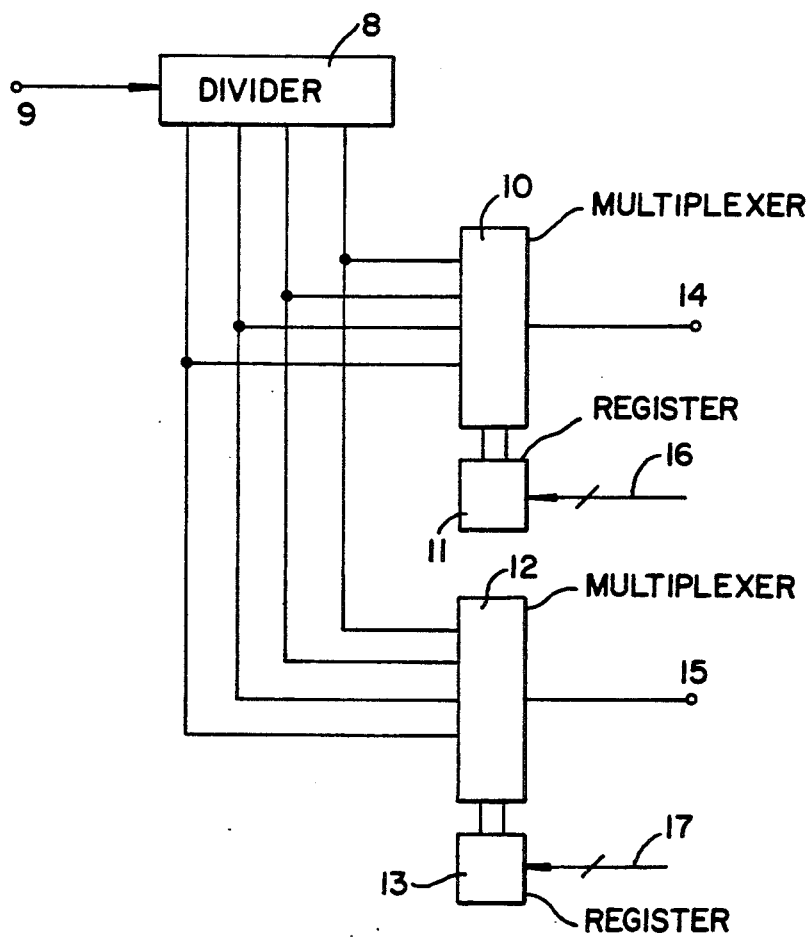
FIG. 2 is a block circuit diagram of a basic circuit configuration for generating various signals.

FIG. 2 shows a divider 8, having an input which is supplied with a clock signal of high frequency and divider outputs which are supplied to inputs of two multiplexers 10, 12. Control inputs of the multiplexers 10, 12 are each connected to a respective register 11, 13. The registers are controlled over data and control lines 16, 17 by a microprocessor. The multiplexers 10, 12 each have a respective output 14, 15, at which the frequency of the first clock signal or the n-multiple signal of the second clock signal can be picked up.

An input frequency 9 is divided by multiples of 2 by the divider 8. As a result, for the second clock signal, the only values of n are powers of 2. The selection of the clock signals is adjusted by the process computer through the registers 11 and 13.

FIG. 3 shows one optional embodiment for triggering programmable events at various rotary angles. A counter output ZA of the third time counter 7 is connected to a first input of a comparator 21. A further control signal 24 is connected to a control input, for instance a reset input of counter 7. A second input of the comparator is connected to a plurality of comparison registers 23, through a non-illustrated multiplexer. Additionally, a further time counter 18 is provided with a clock input which is acted upon by a clock signal 25. A counter output ZA of the counter 18 is connected to a first input of a second comparator 19. A second comparator input is in turn connected through a non-illustrated multiplexer to data outputs of the comparison registers 23. Output signals of the comparators 19, 21 can be picked up at respective output terminals 20, 22.

If an interruption command or a control signal is to be generated at a predetermined rotary angle, then the processor must write a value corresponding to the rotary angle into one of the comparison registers. The comparator 21 then checks the counter state of the third counter 7 with one of the comparison registers 23, and if there is a match with a predefined logical condition, it generates an output signal which may, for instance, be an interruption command or a direct digital control signal. The predefinable "logical" condition may, for instance, be "equality", "larger than" or "smaller than" with respect to a threshold value, or "range match".

The third time counter 7 can be reset to 0 by a control pulse of the control signal 24. Since upon acceleration the total number of counter events between two reference pulses may be less than the n-multiple of the number furnished by the sensor for the angular pulses, the counting cycle of the third counter 7 may optionally be shorter than that intended. Actions that were intended for the counter values that are not yet attained must be taken care of later. Like the resetting of the third counter 7, this can be carried out in an interruption program of the process computer.

In order to provide direct adjustment of times, the counter 18 is operated at a constant frequency at its clock input carrying the clock signal 25 and does not need to be reset. Both the counter 18 and the angle counter, along with the comparator 19, are likewise assigned comparison registers 23. These may, for instance, be the same registers as for the comparator 21. With the aid of this configuration, times can also be adjusted accurately and without acceleration errors. For instance, if the starting edge of a signal is to be tripped at a predetermined angle relative to the reference angle, and the signal is intended to have a defined duration, then the corresponding value is written into an angle comparison register. Once this value is attained, the comparator generates both the starting edge and an interrupt command. In the corresponding interrupt routine, the instantaneous contents of the counter 18 and the desired signal duration are added together, and the result is transferred to one of the comparison registers 23. Once that value is attained, the trailing edge of the signal can be generated.

All of the circuits described above are particularly well suited for integration on a single-chip computer, since the expense is kept within limits, and only digital elements are used.

We claim:

1. Circuit configuration for improving the resolution of successive pulsed signals over time, comprising:
   first and second counters each having one clock input, the clock input of said first counter being supplied with a first clock signal, and the clock input of said second counter being supplied with a second clock signal having an n-multiple frequency of the first clock signal;
   said first counter having a control input and a counter output, the control input of said first counter being supplied with successive pulsed signals;
   said second counter having a counter input, an overflow output and a write input, the write input of said second counter being connected to the overflow output of said second counter;
   a register having a data input, a data output, and a write input, the data input of said register being connected to the counter output of said first counter, the write input of said register being connected to the control input of said first counter, and the data output of said register being connected to the counter input of said second counter;
   a third counter having a clock input connected to the overflow output of said second counter;
   at least one comparison register, and at least one comparator connected between said at least one comparison register and said third counter for comparing the counter state of said third counter with the contents of said at least one comparison register and generating an output signal upon a match with a predefined logical condition;
   at least one further counter being started after the generation of an output signal from said comparator, and at least one further comparator connected between said at least one further counter and said at least one comparison register for comparing the counter state of said further counter with the contents of said at least one comparison register and generating an output signal upon a match with a predetermined logical condition;
   the counter state of said first counter being written into said register through the counter output of said first counter and said first counter being subsequently reset, upon one of the successive pulsed signals being supplied to the control input of said first counter; and
   said second counter assuming the value of said register when an overflow signal is tripped.

2. Circuit configuration according to claim 1, wherein said register is a two's-complement-forming register, and said first and second counters count in the same counting direction.

3. Circuit configuration according to claim 1, wherein said first and second counters count in opposite directions, and said register is a single register.

4. Circuit configuration according to claim 1, wherein said register is a single register, said first and second counters count in the same counting direction, said second counter generates an overflow signal upon attainment of a value stored in memory in said register, and said second counter is reset.

5. Circuit configuration according to claim 1, including means for generating the first and second clock signals and enabling control of the frequency of the first and second clock signals.

6. Circuit configuration for improving the resolution of successive pulsed signals over time, comprising:

first and second counters each having one clock input, the clock input of said first counter being supplied with a first clock signal, and the clock input of said second counter being supplied with a second clock signal having an n-multiple frequency of the first clock signal;

said first counter having a control input and a counter output, the control input of said first counter being supplied with successive pulsed signals;

said second counter having a counter input, an overflow output and a write input, the write input of said second counter being connected to the overflow output of said second counter;

a register having a data input, a data output, and a write input, the data input of said register being connected to the counter output of said first counter, the write input of said register being connected to the control input of said first counter, and the data output of said register being connected to the counter input of said second counter;

a third counter having a clock input connected to the overflow output of said second counter;

a plurality of comparison registers, and at least one comparator connected between said at least one comparison register and said third counter for comparing the counter state of said third counter with the contents of said at least one comparison register and generating an output signal upon a match with a predefined logical condition;

at least one further counter having a clock input being supplied with a clock signal, means for transferring the counter state of said further counter after being increased by a predetermined value to one of said comparison registers after the generation of the output signal of said comparator; and a further comparator connected between said at least one further counter and said one comparison register for comparing the counter state of said further counter with the contents of a preselected comparison register and generating an output signal upon a match with a predetermined logical condition;

the counter state of said first counter being written into said register through the counter output of said first counter and said first counter being subsequently reset, upon one of the successive pulsed signals being supplied to the control input of said first counter; and said second counter assuming the value of said register when an overflow signal is tripped.

7. Circuit configuration according to claim 6, wherein said register is a two's-complement-forming register, and said first and second counters count in the same counting direction.

8. Circuit configuration according to claim 6, wherein said first and second counters count in opposite directions, and said register is a single register.

9. Circuit configuration according to claim 6, wherein said register is a single register, said first and second counters count in the same counting direction, said second counter generates an overflow signal upon attainment of a value stored in memory in said register, and said second counter is reset.

10. Circuit configuration according to claim 6, including means for generating the first and second clock signals and enabling control of the frequency of the first and second clock signals.

* * * * *